United States Patent [19]
Otto

[11] 3,920,324
[45] Nov. 18, 1975

[54] SLIDE TRAY

[75] Inventor: Robert B. Otto, Champlin, Minn.

[73] Assignee: Minnesota Mining and Manufacturing Company, St. Paul, Minn.

[22] Filed: Oct. 3, 1974

[21] Appl. No.: 511,671

Related U.S. Application Data

[63] Continuation-in-part of Ser. No. 376,888, July 5, 1973, Pat. No. 3,873,195.

[52] U.S. Cl.................................... 353/117; 40/79
[51] Int. Cl.²...................................... G03B 23/06
[58] Field of Search........... 353/103, 107, 116, 117; 40/79

[56] References Cited
UNITED STATES PATENTS

| | | | |
|---|---|---|---|
| 2,748,653 | 6/1956 | Pollam | 353/117 |
| 3,609,025 | 9/1971 | Hall | 353/107 |

*Primary Examiner*—Richard E. Aegerter
*Assistant Examiner*—A. J. Mirabito
*Attorney, Agent, or Firm*—Alexander, Sell, Steldt & DeLaHunt

[57] ABSTRACT

A circular slide tray in which the guide walls defining the slide receiving slots terminate spaced from the hub to provide close packing of adjacent slides at the hub. The guide walls are recessed at one face of the tray, the recess being beveled progressing radially and axially inward of the tray to provide proper alignment of the slide receiving slots with a slide projector by the normal slide pusher bar. And, a slide retaining strip extends around the hub and has straight fibers extending radially therefrom to guide and retain the edges of the slides adjacent the hub to maintain the slides in proper alignment.

1 Claim, 5 Drawing Figures

SLIDE TRAY

REFERENCE TO RELATED APPLICATION

This is a continuation-in-part of application Ser. No. 376,888, filed July 5, 1973, now U.S. Pat. No. 3,873,195.

FIELD OF THE INVENTION

The present invention relates to a circular slide tray in which the guide walls defining the slide receiving slots terminate spaced from the hub to provide a high density slide packing arrangement.

BACKGROUND OF THE INVENTION

The prior art as exemplified by U.S. Pat. Nos. 3,359,667 and 3,419,981 has recognized the advantage of terminating the slide tray guide walls that define the slide receiving slots spaced from the hub of the tray so that the edges of the slides adjacent the hub are in a close packed arrangement. In this manner the maximum number of slides can be accomodated in the tray. However, the slide receiving slots must be made large enough to accept slides of maximum thickness and when slides of a lesser thickness are utilized it is possible for the slides to assume tilted positions. In use a tilted slide may be engaged by the slide changing mechanism at the same time as the preceding or following slide resulting in a jamming of the mechanism. This problem is recognized in U.S. Pat. No. 3,419,981 wherein a structure intended to overcome this problem is included in the slide changing mechanism of the projector. This solution has been found to be unsatisfactory, however, in that it does not solve the problem at the source, the slide tray, but rather requires an entirely new slide projector.

SUMMARY OF THE INVENTION

The present invention provides a circular slide tray which may be utilized in many of the slide projectors in current use wherein a slide pusher bar moves transversely across a tunnel to move a slide from a tray into projection position in the projector. The slide tray includes a cylindrical hub, a base wall extending from one end of the hub perpendicular to the axis of the hub and a peripheral edge wall extending perpendicularly from the base wall around the hub to define an annular slide receiving area between the edge wall and the hub. A plurality of similar, equally spaced, slide guide walls extend from the peripheral edge wall radially inward toward the hub and terminate spaced from the hub to provide close packing of adjacent slides at the hub, two adjacent guide walls defining with the edge wall and the hub a slide receiving slot. A slide retaining strip extends around the hub and has straight fibers extending radially therefrom to guide a slide as it is moved into a slot and to apply pressure to the edge of the slide adjacent the hub to retain the slide in the slot, thereby to receive and maintain the slides in proper alignment in the receiving slots. Means are provided to engage a slide projector for stepwise advancement of the tray to align successive slide receiving slots with a slide pusher bar and a fixed opening in the projector into which a slide is to be pushed. The base wall is formed with openings communicating with each of the slide receiving slots for access by the slide pusher bar and movement thereof parallel to the axis of the hub to move a slide from a slot into the fixed opening in the projector.

DESCRIPTION OF THE PREFERRED EMBODIMENT

Figure 1:
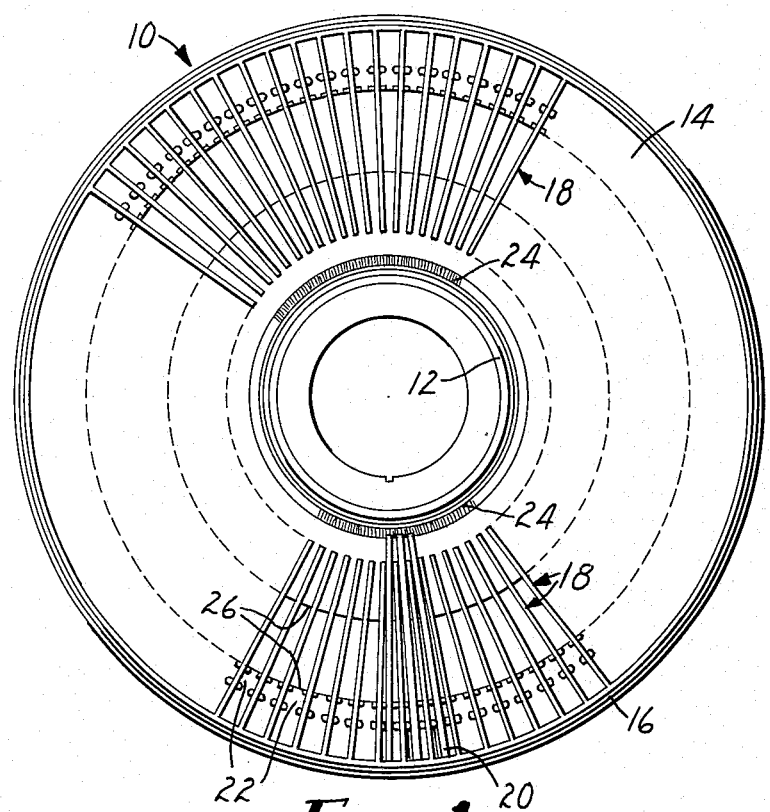
FIG. 1 is a top view of a slide tray constructed in accordance with the present invention.

The circular slide tray of the present invention, generally designated 10, includes a hollow, generally cylindrical hub 12, a base wall 14 extending from one end of the hub perpendicular to the axis of the hub and a peripheral edge wall 16 extending perpendicularly from the base wall 14 around the hub 12 to define an annular slide receiving area between the edge wall 16 and the hub 12. A plurality of similarly equally spaced slide guide walls 18 extend from the peripheral edge wall 16 radially inward toward the hub 12 and terminate spaced from the hub to provide close packing of adjacent slides 20 at the hub, two adjacent guide walls 18 defining with the edge wall 16 and the hub 12 a slide receiving slot 22. In the illustrated embodiment the hub 12, the base wall 14, the peripheral edge wall 16 and the guide walls 18 are unitary, being molded from a polymeric material, for example a high impact, high temperature styrene. Gear teeth 23 are also molded around the periphery at the bottom of the tray 10 to engage a mating drive gear in a slide projector for stepwise advancement of the tray to align the slide receiving slots 22 one at a time with the slide changing mechanism in the projector.

A slide retaining strip 24 extends around and is secured to the hub 12. The strip 24 comprises a fabric base from which straight fibers, such as nylon fibers, extend perpendicularly. When the strip 24 is secured around the hub the fibers thus extend radially from the hub to guide and retain the edges of slides adjacent the hub 12. A suitable slide retaining strip material is available under the trade name Fibre-Tran from the Minnesota Mining and Manufacturing Company with offices at Saint Paul, Minn.

Figure 3:
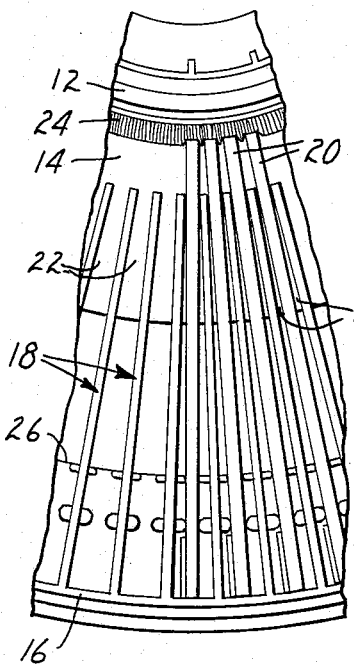
FIG. 3 is a top view of a portion of the slide tray of FIG. 1.
Figure 4:
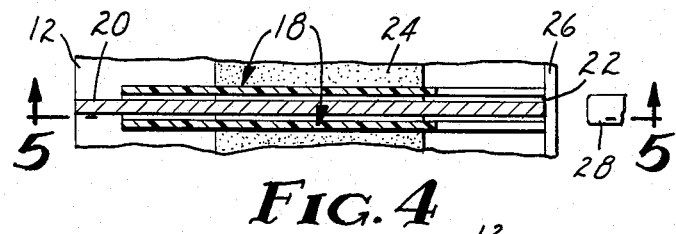
FIG. 4 is a cross-sectional view taken along line 4—4 of FIG. 2.

The base wall 14 is formed with openings 26 communicating with each of the slide receiving slots 22 for access by a slide pusher bar 28 and movement thereof parallel to the axis of the hub 12 to remove a slide from a slide receiving slot 22. Each slide guide wall 18 is formed with a recess 30 in axial alignment with the adjacent base wall opening 26 and it is beveled at the end of the recess in a direction progressing axially and radially inward of the tray. As is apparent in FIGS. 1 and 3, the slide guide walls 18 are spaced further apart at the periphery of the tray and approach each other as they progress towards the hub 12. Beveling of the guide walls 18 at the end of the recesses 30 causes a slide pusher bar 28 when moved to push a slide into projection position to be inserted into a slide receiving slot 22 between a pair of guide walls 18 in a greater spacing therebetween and progress to a lesser spacing where the pusher bar 28 contacts both guide walls to precisely align the slide receiving slot 22 with the opening in the projector into which the slide is pushed for projection.

Figure 2:
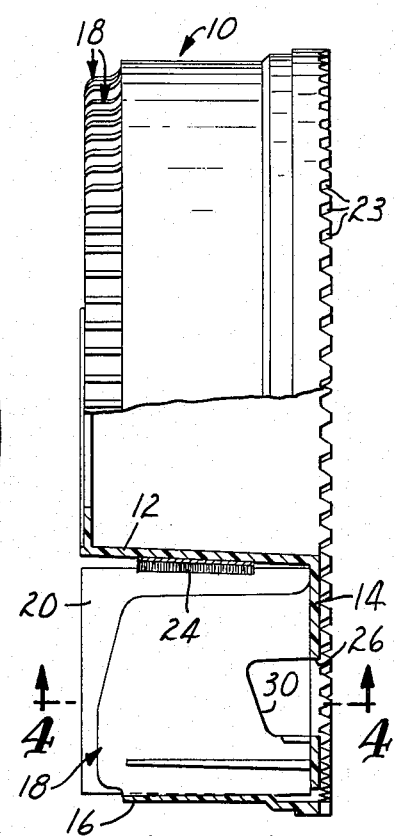
FIG. 2 is an edge view partially in section of the slide tray of FIG. 1.
Figure 5:
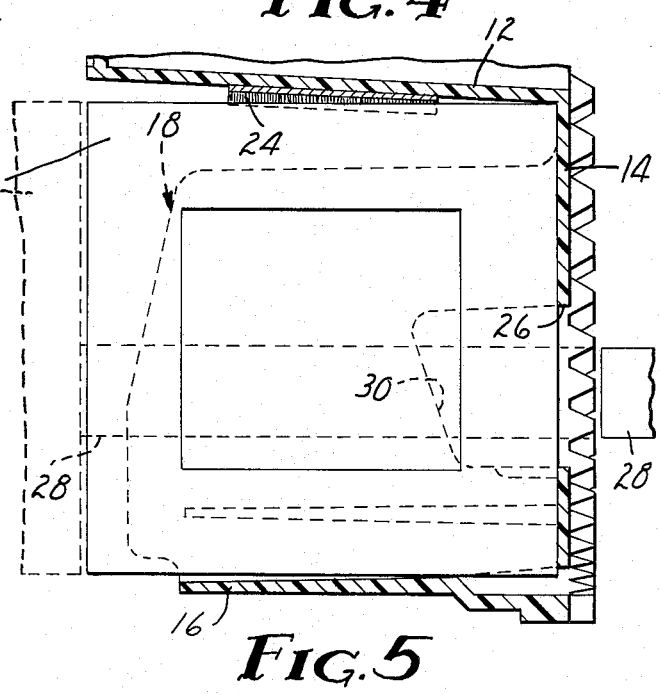
FIG. 5 is a cross-sectional view taken along line 5—5 of FIG. 4.

In use, the slide tray 10 is placed on edge as illustrated in FIG. 2, in the tunnel of a slide projector with the gear teeth 23 on the tray engaging the mating drive gear in the projector. Mating of the gear teeth 23 on the tray 10 with the drive gear in the projector generally aligns a slide receiving slot 22 in the tray with the slide pusher bar 28 and the opening to the slide projection position in the projector, as illustrated in FIG. 5.

Actuation of the slide changing mechanism in the projector causes the slide pusher bar 28 to move into the adjacent opening 26 in the base wall 14 of the tray 10 and engage an edge of the slide 20 in the slide receiving slot 22. Continued movement of the bar 28 pushes the slide 20 out of the slide receiving slot 22 and into the projector. As the slide 20 is being pushed into the projector the pusher bar 28 enters between and contacts the sides of the adjacent guide walls 18 defining the receiving slot for that slide and squarely aligns the slide receiving slot from which the slide is being pushed with the opening in the projector as previously described.

When it is desired to change the slide 20 being projected, the slide in the projector is pushed back into the aligned receiving slot 22. The slide receiving slot, having been squarely aligned by the pusher bar 28, accepts the slide and the fibers of the slide retaining strip 24 part and guide the slide centrally into the slot. The fibers of the retaining strip 24 also apply pressure against the edge of the slide they contact to retain the slide in the slot even when the tray is removed and inverted.

After the projected slide is fully returned to its slot the tray 10 is advanced one slot by the drive gear in the projector and the slide in that slot is then ready for movement into the projector in the same manner as the first slide.

The parting of the fibers that are first contacted by a slide as it is returned to a slide receiving slot apply equal pressure on both sides of the slide thereby to guide the slide to maintain the proper central alignment of the slide as it is fully returned to the slot. In fact, a slide tray constructed in accordance with the present invention but without the slide guide walls has been found to provide proper guiding and retention of slides. The slide guide walls are still necessary to determine where to insert the slides in the tray when loading by hand (because of the relationship of the receiving slots to the tray advancing gear to produce proper alignment with the projector), but since the slides are properly guided and retained by the slide retaining strip the slide guide walls can be and are terminated spaced from the hub to obtain the advantageous high density slide packing arrangement. The fibrous slide retaining strip also provides the additional advantages of producing little wear on the edges of the usual cardboard slides and of accepting slides of varying heights within a normal tolerance range without an increase in the force applied to the edges of the slides.

I claim:

1. A circular slide tray comprising:
a cylindrical hub,
a base wall extending from one end of said hub perpendicular to the axis of said hub,
a peripheral edge wall extending perpendicularly from said base wall around said hub to define an annular slide receiving area between said edge wall and said hub,
a plurality of similar equally spaced slide guide walls extending from said peripheral edge wall radially inward toward said hub and terminating spaced from said hub to provide close packing of adjacent slides at said hub, two adjacent guide walls defining with said edge wall and said hub a slide receiving slot,
a strip of material extending around said hub and having straight fibers extending radially therefrom into each of said slide receiving slots to guide a slide as it is moved into a said slot and to apply pressure to the edge of the slide adjacent said hub to retain the slide in said slot, and
means adapted to engage a slide projector for stepwise advancement of said tray to align successive slide receiving slots with a slide pusher bar and a fixed opening in the projector into which a slide is to be pushed,
said base wall being formed with openings communicating with each of said slide receiving slots for access by the slide pusher bar and movement thereof parallel to the axis of said hub to move a slide from a said slot into the fixed opening in the projector.

* * * * *